(No Model.)
J. G. GROFF.
SAW GUARD.
No. 266,466. Patented Oct. 24, 1882.
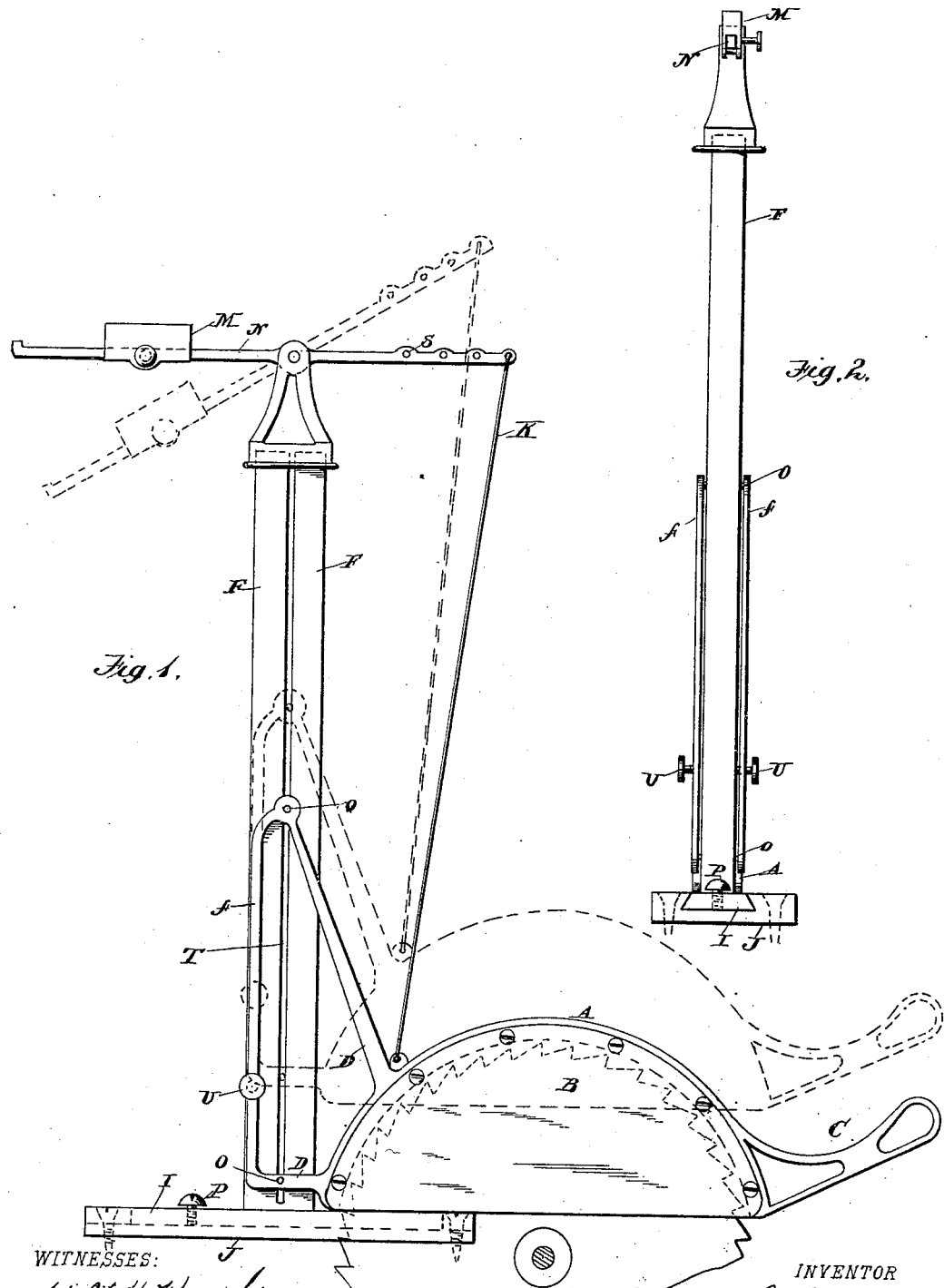
WITNESSES:
INVENTOR
Joseph G. Groff
by Melville Church
His Attorney.

United States Patent Office.

JOSEPH G. GROFF, OF CONNERSVILLE, INDIANA.

SAW-GUARD.

SPECIFICATION forming part of Letters Patent No. 266,466, dated October 24, 1882.

Application filed July 15, 1882. (No model.)

*To all whom it may concern:*

Be it known that I, JOSEPH G. GROFF, of Connersville, in the county of Fayette and State of Indiana, have invented certain new and useful Improvements in Hoods or Guards for Circular Saws; and I do hereby declare the following to be a full, clear, and exact description of the same, reference being had to the accompanying drawings, in which—

Figure 1 represents a side elevation of a hood constructed in accordance with my invention. Fig. 2 is a rear elevation of the same.

Similar letters of reference in the several figures denote the same parts.

My present invention has for its object to further improve that class of saw-hoods for which Letters Patent of the United States were granted to me on the 27th day of September, 1881, and for which I have filed two several applications for Letters Patent, the one bearing date on the 23d day of November, 1881, and the other bearing date on the 22d day of May, 1882; and its novelty consists in certain improvements in the means for raising the hood and maintaining it in elevated position, and also in means for regulating the lateral adjustment and position of the hood.

Referring to the accompanying drawings, A represents the rim of the hood; B, the removable sides of the same; C, the upwardly-inclined projection or handle at the front of the hood; D, the arms at the rear of the hood, adapted to embrace the vertical standards F F, and having metallic pins O O, working in a slot, T, between the standards F F, and serving to guide the hood in its upward and downward movements.

Mounted upon the cap or top of the standards F F is a pivoted lever, N, upon the longer arm of which is arranged an adjustable sliding weight, M, and the shorter arm of which is provided with a series of perforations, S, in one of which is secured one end of a cord or strap, K, which is fastened at the other end to the hood, as shown. This pivoted lever and adjustable weight enable the hood to be counterbalanced or partly counterbalanced to the extent required to enable the hood to be easily raised and lowered, both automatically by the lumber and by hand, when desired.

When for any purpose it is necessary to hold the hood elevated above the saw the hood is raised so as to increase the leverage of the weight on the lever, as shown in dotted lines in Fig. 1. The parts are then held steadily without further fastenings.

Each pair of arms D D is connected by a bar, *f*, through which works a set-screw, U, and said set-screws are arranged opposite each other on opposite sides of the standard and serve the purpose of taking up all lateral or side motion of the hood, and also of affording ready means for adjusting laterally in either direction the front of the hood.

The standards F F are connected at the bottom to a sliding plate, I, which is adapted to be moved forward and backward in a bed-plate, J, secured to the table, and is capable of being locked or tightened in the desired position by means of the set-screw P.

A saw-guard constructed in this manner combines lightness with durability, and is capable of the nicest adjustments.

Having thus described my invention, I claim as new—

1. The combination, with the vertically-movable saw-hood, of the lifting-cord and pivoted lever and the adjustable weight arranged upon the lever, substantially as described.

2. The combination of the hood, the vertical standards having the slot between them, the arms projecting from the hood on opposite sides of the standards, the cross-pins playing in the slot, and the set-screws extending through the hood-arms and adapted to bear upon opposite sides of the standards, so as to regulate the lateral position of the hood, substantially as described.

JOSEPH G. GROFF.

Witnesses:
W. C. FORREY,
FLORENTIN MICHAEL.